(12) United States Patent
Yu (10) Patent No.: US 8,947,705 B2
(45) Date of Patent: Feb. 3, 2015

(54) NON-TRANSITORY RECORDING MEDIUM AND PRINT PROCESSING METHOD

(75) Inventor: Zhipeng Yu, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 138 days.

(21) Appl. No.: 13/606,680

(22) Filed: Sep. 7, 2012

(65) Prior Publication Data

US 2013/0083356 A1 Apr. 4, 2013

(30) Foreign Application Priority Data

Sep. 29, 2011 (JP) ................. 2011-214192

(51) Int. Cl.
*G06K 15/02* (2006.01)
*G06F 3/12* (2006.01)

(52) U.S. Cl.
CPC ............ *G06F 3/1292* (2013.01); *G06F 3/1204* (2013.01); *G06F 3/1226* (2013.01); *G06F 3/1236* (2013.01)
USPC .......................... 358/1.15; 358/1.13; 358/1.14

(58) Field of Classification Search
CPC ... G06F 3/1204; G06F 3/1226; G06F 3/1236; G06F 3/1292
USPC ....................................................... 358/1.15
See application file for complete search history.

(56) References Cited

U.S. PATENT DOCUMENTS

| 2007/0127069 | A1 | 6/2007 | Steele et al. |
| 2010/0007905 | A1* | 1/2010 | Murashita ................. 358/1.13 |
| 2010/0027065 | A1* | 2/2010 | Koakutsu ................. 358/1.15 |
| 2011/0063668 | A1 | 3/2011 | Shirai |
| 2012/0026539 | A1 | 2/2012 | Ohara |

FOREIGN PATENT DOCUMENTS

| JP | 2006-185157 A | 7/2006 |
| JP | 2009-071664 A | 4/2009 |
| JP | 2012-032958 A | 2/2012 |

* cited by examiner

*Primary Examiner* — King Poon
*Assistant Examiner* — Iriana Cruz
(74) *Attorney, Agent, or Firm* — McCarter & English, LLP (57) ABSTRACT

This disclosure discloses a non-transitory recording medium storing a print processing program for executing steps comprising: an instruction determining step for determining whether or not there is an input of a printing instruction; an identification information determining step for determining whether or not there is a plurality of sets of the identification information registered; a first printer determining step for attempting to perform information transmission and reception with one first printer for which a printing operation history log that satisfies a predetermined condition, and determining whether or not information transmission and reception are possible with the first printer; and a first print data transmitting step for transmitting desired print data associated with the input of the printing instruction to the first printer in a case where the determination is made in the first printer determining step that information transmission and reception are possible with the first printer.

11 Claims, 10 Drawing Sheets

NON-TRANSITORY RECORDING MEDIUM AND PRINT PROCESSING METHOD

CROSS-REFERENCE TO RELATED APPLICATION

The present application claims priority from Japanese Patent Application No. 2011-214192, which was filed on Sep. 29, 2011, the disclosure of which is incorporated herein by reference in its entirety.

BACKGROUND

1. Field

The present disclosure relates to a non-transitory recording medium storing a print processing program executed by an operation terminal connected to a printer, and a print processing method using the same.

2. Description of the Related Art

Systems that an operated device is operated from a hand-held operation terminal via wireless communication are disclosed. In this prior art, the operated device (Bluetooth device) and operation terminal (hand-held terminal) are connected by Bluetooth (registered trademark) communication, making it possible for the operated device to execute an operation linked to information transmitted from the operation terminal.

In recent years, systems wherein a printer is applied as the operated device and the printer is made to perform desired printing via wireless communication when an operator suitably operates operation device of the operation terminal are increasingly proposed. According to the operation terminal connectable to the printer in such a system, identification information (name, address information, etc.) unique to each printer is generally registered each time a printer is newly connected and printing is executed (a printing operation is performed).

Here, in a case where the operation terminal and printer are connected via wireless communication and information transmission and reception are performed, the operation terminal is carried and connected to printers in various locations when used, causing printing operation history logs to sequentially occur with a large number of printers as the period of usage increases. In such a case, the identification information of a large number of printers is thus sequentially registered and accumulated. With such a large number of printers registered, the operator must perform operations such as follows in order to perform a printing operation from the operation terminal with any one of these large number of registered printers (that is, that have been connected in the past) at one particular occasion. That is, from the identification information of the large number of printers, the operator must find the identification information of the one printer with which the connection attempt is to be made, select that identification information to identify that one printer, execute wireless connection, and then transmit the print data. In such a case, even if the one printer with which the printing operation attempt is to be made is right in front of or in close range to the operator, for example, the operator must perform such operations as described above, such as search for and select the identification information, execute wireless connection, and perform transmission, making the labor burden extremely troublesome for the operator.

SUMMARY

It is therefore an object of the present disclosure to provide a non-transitory recording medium storing a print processing program and a print processing method capable of reducing the labor burden of the operator during a printing operation, even if the identification information of a large number of printers is registered In order to achieve the above-mentioned object, according to the first aspect, there is provided a non-transitory recording medium capable of reading by a control device, storing a print processing program for executing steps on the control device provided at an operation terminal that comprises a communication device configured to perform wireless communication with at least one printer, an operation device configured to execute a desired operation, a registration device configured to sequentially register identification information unique to each printer each time a printer is newly connected and wireless communication is performed by the communication device, a storage device configured to store a printing operation history log of a printer via the operation device, and the control device configured to control the operation device and the storage device, the steps comprising an instruction determining step for determining whether or not there is an input of a printing instruction via the operation device, an identification information determining step for determining whether or not there is a plurality of sets of the identification information registered in the registration device in a case where the determination is made in the instruction determining step that there is an input of the printing instruction, a first printer determining step for attempting to perform information transmission and reception via the communication device with one first printer for which a printing operation history log that satisfies a predetermined condition of new history log is stored in the storage device, and determining whether or not information transmission and reception are possible with the first printer, in a case where the determination is made in the identification information determining step that there is the plurality of sets of the identification information, and a first print data transmitting step for transmitting desired print data associated with the input of the printing instruction to the first printer via the communication device in a case where the determination is made in the first printer determining step that information transmission and reception are possible with the first printer.

The print processing program according to the first aspect is executed by the control device of the operation terminal The operation terminal comprises the communication device, the operation device, the registration device, the storage device, and the control device. Further, this operation terminal is information transmittably and receivably connected by wireless communication to at least one printer via the communication device. Then, each time a printer is newly connected and print data is transmitted by wireless communication to execute printing (a printing operation is performed), the registration device registers the identification information (name, address information, etc.) unique to each printer.

Here, in a case where the operation terminal and printer are connected via wireless communication and information transmission and reception are performed as in the first aspect, the operation terminal is carried and connected to printers in various locations when used, causing printing operation history logs of a large number of printers to sequentially occur as the period of usage increases. In such a case, the identification information of a large number of printers is thus sequentially registered by the registration device and accumulated. With such a large number of printers registered, the operator must perform operations such as follows in order to perform a printing operation from the operation terminal with any one of these large number of registered printers (that is, that have been connected in the past) at one particular occasion. That is, from the identification information of the large number of printers, the operator must find the identification information of the one printer with which the connection attempt is to be made, select that identification information to identify that one printer, execute wireless connection, and then transmit the print data. In such a case, even if the one printer with which a printing operation attempt is to be made is right in front of or in close range to the operator, for example, the operator must perform such operations as described above, such as search for and select the identification information, execute wireless connection, and perform transmission, making the labor burden significant for the operator.

Here, according to the first aspect, when the control device executes the print processing program, the control device executes an instruction determining step, an identification information determining step, a first printer determining step, and a first print data transmitting step. That is, when the operator uses the operation device and performs printing instruction input, the control device determines that the condition of the instruction determining step is satisfied and, in the subsequent identification information determining step, whether or not a plurality of sets of the registered identification information exists. When a large number of sets of identification information is registered due to the printing operation history logs of a large number of printers as previously described, the control device determines that the condition is satisfied and, in the first printer determining step, attempts to perform information transmission and reception with the one printer (first printer) having the printing operation history log that satisfies a predetermined condition of new history log. With this arrangement, in a case where an attempt is currently made to perform a printing operation using once again the same printer as during the previous operation, the operator brings the operation terminal relatively near the printer and performs the printing instruction input operation, thereby causing the information transmission and transmission operation to succeed and the condition of the first printer determining step to be satisfied. As a result, in the first print data transmitting step following the first printer determining step, the control device transmits the desired print data linked to the printing instruction input to the first printer, thus causing printing linked to the print data to be executed by the first printer.

As described above, in the first aspect, in a case where at least an attempt is made to execute printing using the same printer as the previous time, the operator only needs to perform a printing instruction input operation relatively near the printer, even if the identification information of a large number of printers is registered. As a result, compared to the prior technique which always requires operations such as searching for and selecting the identification information of the one printer with which an attempt to execute printing is to be made, executing wireless communication, and performing transmission, it is possible to significantly reduce the labor burden of the operator.

In order to achieve the above-mentioned object, according to the second aspect, there is provided a print processing method executed by an operation terminal that comprises a communication device configured to perform wireless communication with at least one printer, an operation device configured to execute a desired operation, a registration device configured to sequentially register identification information unique to each printer each time a printer is newly connected and wireless communication is performed by the communication device, and a storage device configured to store a printing operation history log of a printer via the operation device, the print processing method comprising the steps of an instruction determining step for determining whether or not there is an input of a printing instruction via the operation device, an identification information determining step for determining whether or not there is a plurality of sets of the identification information registered in the registration device in a case where the determination is made in the instruction determining step that there is an input of the printing instruction, a first printer determining step for attempting to perform information transmission and reception via the communication device with one first printer for which a printing operation history log that satisfies a predetermined condition of new history log is stored in the storage device, and determining whether or not information transmission and reception are possible with the first printer, in a case where the determination is made in the identification information determining step that there is the plurality of sets of the identification information, and a first print data transmitting step for transmitting desired print data associated with the input of the printing instruction to the first printer via the communication device in a case where the determination is made in the first printer determining step that information transmission and reception are possible with the first printer.

The print processing method according to the second aspect is executed by the operation terminal. The operation terminal comprises the communication device, the operation device, the registration device, and the storage device. Further, this operation terminal is information transmittably and receivably connected by wireless communication to at least one printer via the communication device. Then, each time a printer is newly connected and print data is transmitted by wireless communication to execute printing (a printing operation is performed), the registration device registers the identification information (name, address information, etc.) unique to each printer.

Here, in a case where the operation terminal and printer are connected via wireless communication and information transmission and reception are performed as in the second aspect, the operation terminal is carried and connected to printers in various locations when used, causing printing operation history logs for a large number of printers to sequentially occur as the period of usage increases. In such a case, the identification information of a large number of printers is thus sequentially registered by the registration device and accumulated. With such a large number of printers registered, the operator must perform operations such as follows in order to perform a printing operation from the operation terminal with any one of these large number of registered printers (that is, that have been connected in the past) at one particular occasion. That is, from the identification information of the large number of printers, the operator must find the identification information of the one printer with which a connection attempt is to be made, select that identification information to identify that one printer, execute wireless connection, and then transmit the print data. In such a case, even if the one printer with which a printing operation attempt is to be made is right in front of or in close range to the operator, for example, the operator must perform such operations as described above, such as search for and select the identification information, execute wireless connection, and perform transmission, making the labor burden significant for the operator.

Here, according to the print processing method of the second aspect, an instruction determining step, an identification information determining step, a first printer determining step, and a first print data transmitting step are executed. That is, when the operator uses the operation device and performs printing instruction input, the control device determines that the condition of the instruction determining step is satisfied and, in the subsequent identification information determining step, whether or not a plurality of sets of the registered identification information exists. When a large number of sets of identification information is registered due to the printing operation history logs of a large number of printers as previously described, the control device determines that the condition is satisfied and, in the first printer determining step, attempts to perform information transmission and reception with the one printer (first printer) having the printing operation history log that satisfies a predetermined condition of new history log. With this arrangement, in a case where an attempt is currently made to perform a printing operation using once again the same printer as during the previous operation, the operator brings the operation terminal relatively near the printer and performs the printing instruction input operation, thereby causing the information transmission and transmission operation to succeed and the condition of the first printer determining step to be satisfied. As a result, in the first print data transmitting step following the first printer determining step, the control device transmits the desired print data linked to the printing instruction input to the first printer, thus causing printing linked to the print data to be executed by the first printer.

As described above, in the second aspect, in a case where at least an attempt is made to executing printing using the same printer as the previous time, the operator only needs to perform a printing instruction input operation relatively near the printer, even if the identification information of a large number of printers is registered. As a result, compared to the prior technique which always requires operations such as searching for and selecting the identification information of the one printer with which an attempt to execute printing is to be made, executing wireless communication, and performing transmission, it is possible to significantly reduce the labor burden of the operator.

DETAILED DESCRIPTION OF THE PREFERRED EMBODIMENTS

Figure 1:
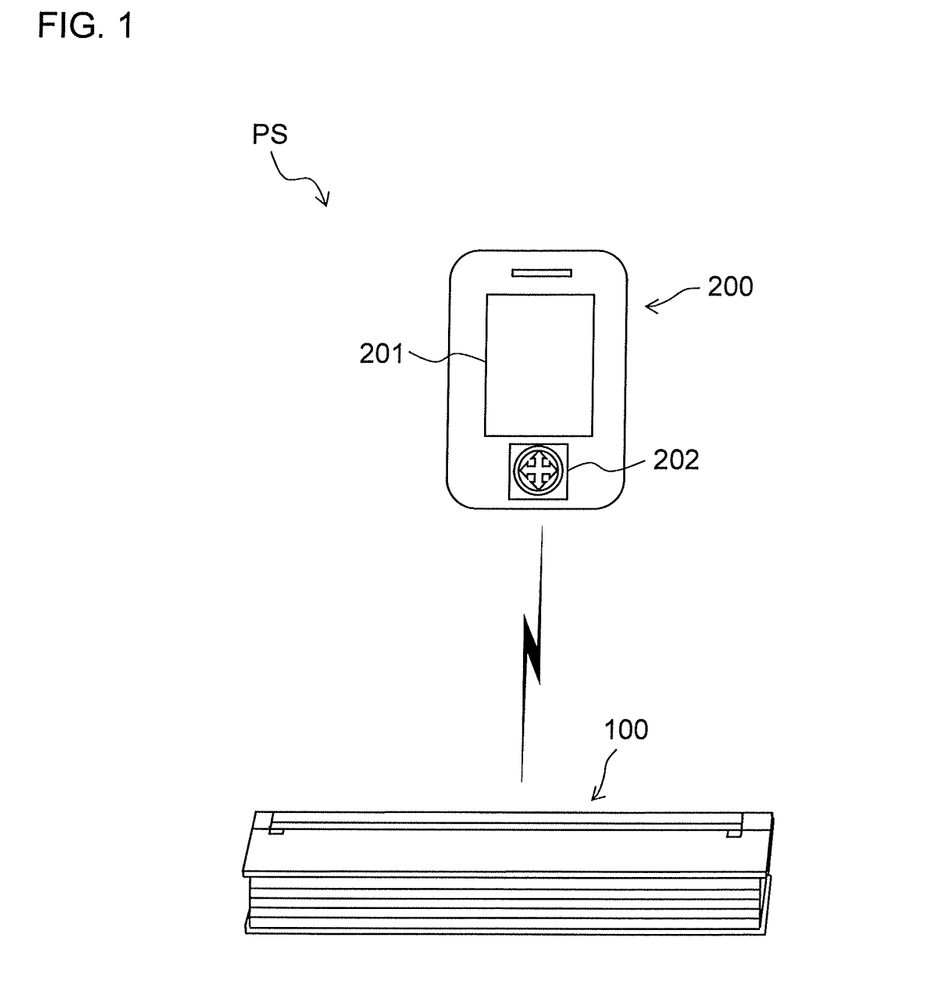
FIG. 1 is a system configuration diagram showing the operation terminal to which an embodiment of the present disclosure is applied, along with a printer.

The following describes one embodiment of the present disclosure with reference to accompanying drawings.
System Configuration FIG. 1 shows an operation terminal to which this embodiment is applied, along with a printer which serves as the operation target. In FIG. 1, a printing system PS comprises a hand-held printer 100 and an operation terminal 200. The hand-held printer 100 and the operation terminal 200 are information transmittably and receivably connected by Bluetooth (registered trademark) communication.

The operation terminal 200 is an information terminal such as a PDA (hand-held information terminal) comprising a function linked to the above described Bluetooth communication or a smart phone (hand-held telephone comprising a PDA function), for example. This operation terminal 200 comprises a touch panel 201 and an operation button 202, for example. The touch panel 201 comprises a display function that displays various information and messages by a liquid crystal display, etc., and permits the operator to input desired instructions and information with the above described operation button 202. Accordingly, hereinafter, the above described display function section of the touch panel is simply referred to as the "display part 201," and the above described operation function section of the touch panel and the above described operation button are simply referred to as the "operation part 202." The operation terminal 200, according to this example, attempts to transmit and receive information with the hand-held printer 100 via Bluetooth communication and, only when information transmission and reception are possible, is capable of printing desired print data from the hand-held printer 100.
Printer Configuration The following describes the general configuration of the above described hand-held printer 100 with reference to FIG. 2 and FIG. 3.

Figure 2:
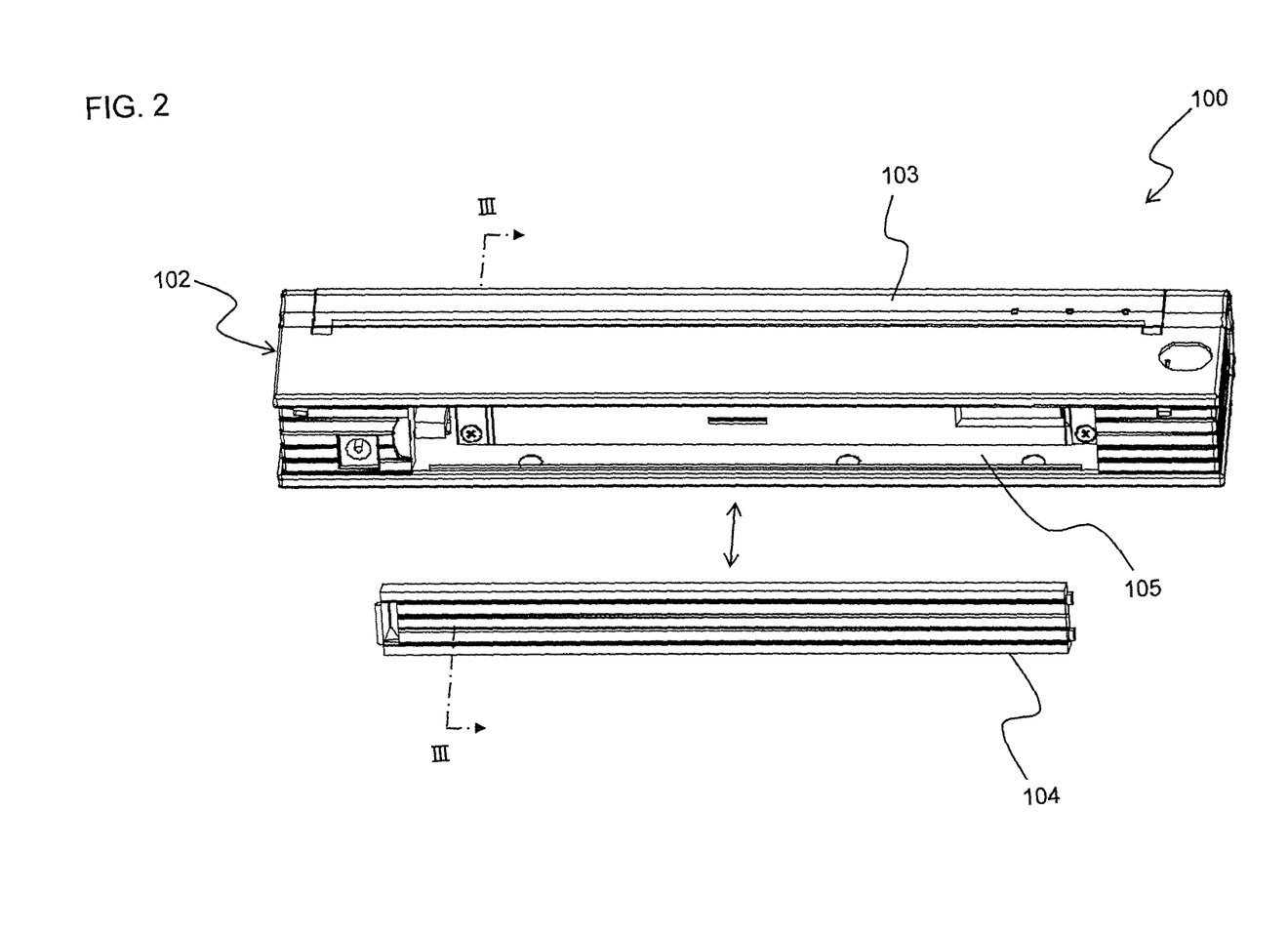
FIG. 2 is a perspective view of the outer appearance of a hand-held printer, as viewed diagonally from the rear side.

The hand-held printer 100 comprises a housing 102 formed into an overall substantially cuboid shape. A cover member 103 is openably and closeably provided to the upper surface of the housing 102 on the rear side in the drawing. During printing, a print-receiving paper S (see FIG. 4 described later) is inserted into the gap (not shown) with this cover member 103. The lateral surface of the housing 102 positioned on the front side in FIG. 2 is equivalent to the rear surface section of the hand-held printer 100, and a battery chamber cover 104 is detachably provided to this rear surface section. In a state where the battery chamber cover 104 is removed, a battery storage chamber 105 that stores a battery power source 107 (see FIG. 3) opens to the rear surface section of the housing 102.

Figure 3:
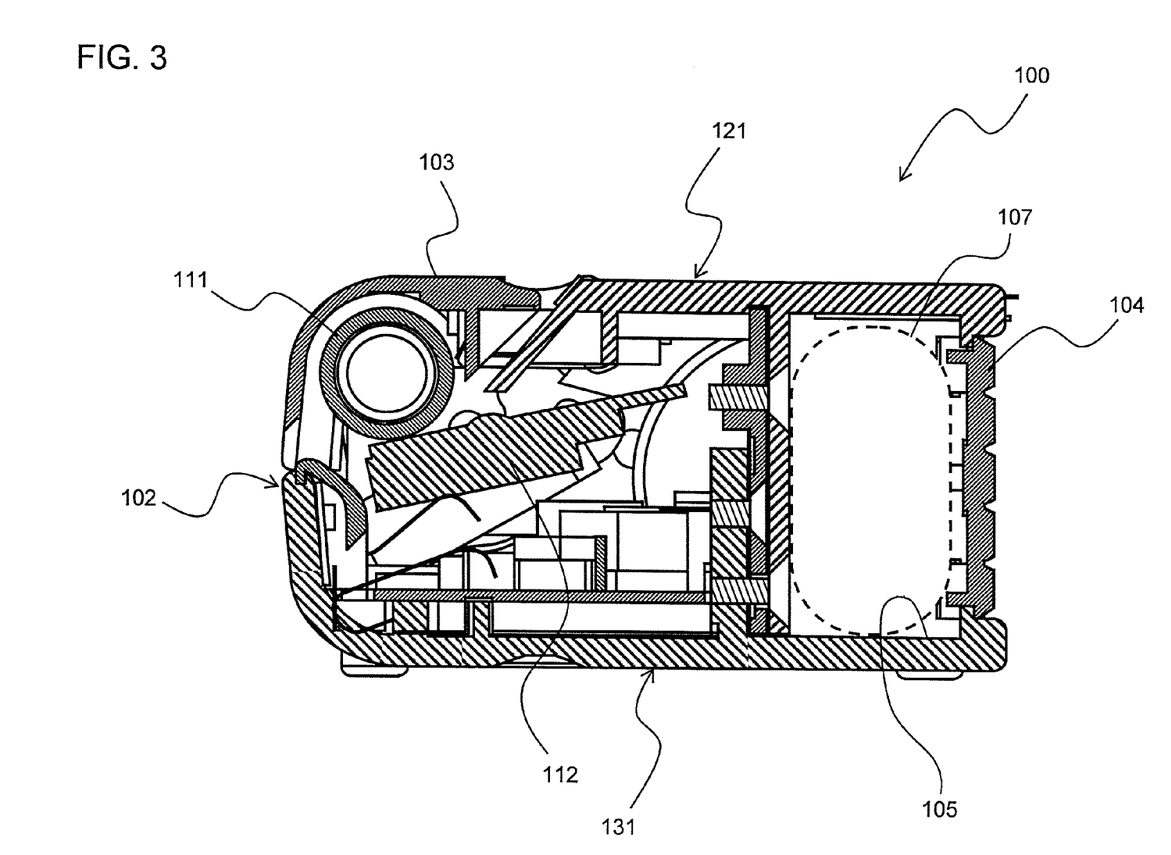
FIG. 3 is a lateral cross-sectional view along line III-III in FIG. 2 showing the internal structure of the hand-held printer.

A platen roller 111 and a thermal line head 112 are provided inside the housing 102. The platen roller 111 is rotatably supported in the interior of the housing 102, and the print-receiving paper S is fed out when rotationally driven by a drive mechanism (not shown). The thermal line head 112 is provided to the above described platen roller 111 so that it can make contact with or part from the platen roller 111, contacts the platen roller 111 under a predetermined contact pressure during printing, and performs desired printing on the print-receiving paper S inserted therebetween.

Normally, the print-receiving paper S is inserted into the feeding path of the gap with the cover member 103 closed, causing the print-receiving paper S to be fed by the platen roller 111 and desired printing to be performed by the thermal line head 112 on the print-receiving paper S. Note that the cover member 103 is opened for paper jam removal. At this time, the platen roller 111 is released from the thermal line head 112, making it possible to easily take out the paper.

The housing 102 comprises a top cover 121, an undercover 131, and two side covers (not shown).

Functional Configuration of Printer and Operation Terminal

The functional configuration of the hand-held printer 100 and the operation terminal 200 will now be described with reference to FIG. 4.

Figure 4:
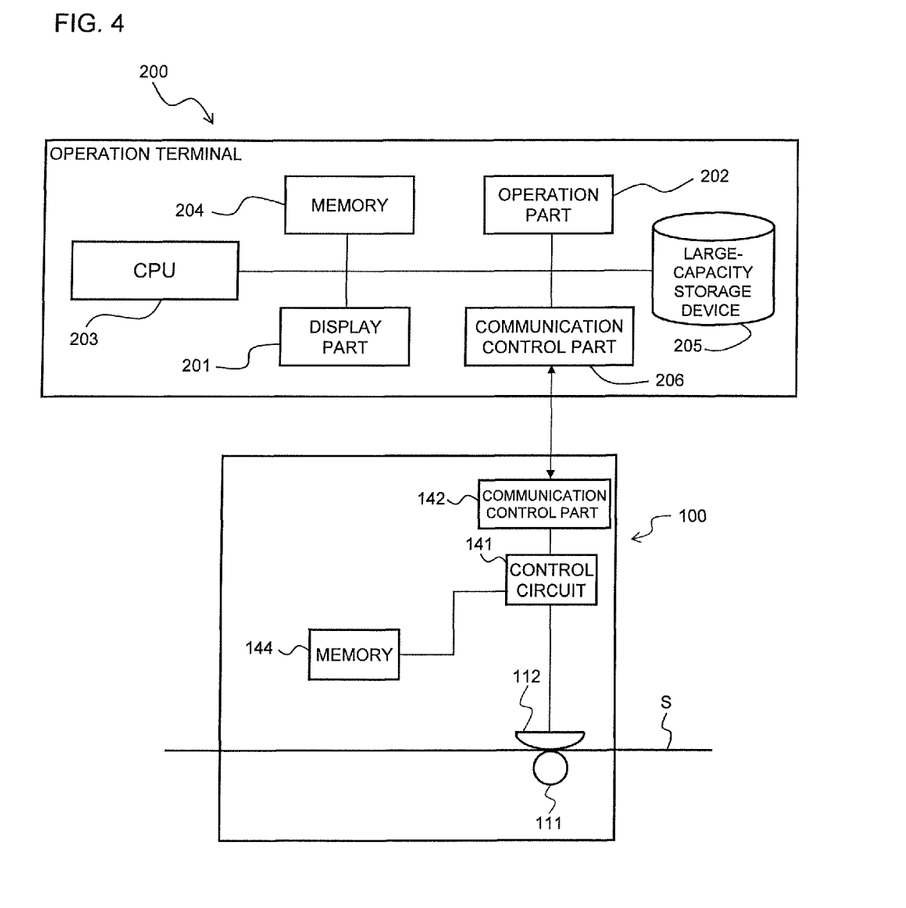
FIG. 4 is a block diagram showing the functional configuration of the hand-held printer and operation terminal.

In FIG. 4, the hand-held printer 100 comprises the above described thermal line head 112 that performs desired printing on the print-receiving paper S, the above described platen roller 111, a control circuit 141, a memory 144 comprising RAM, ROM, and the like, for example, and a communication control part 142 configured to control the above described Bluetooth communication performed with the above described operation terminal 200.

The operation terminal 200 comprises a CPU 203, a memory 204 comprising RAM, ROM, and the like, for example, the above described operation part 202, the above described display part 201, a large-capacity storage device 205 made of a hard disk device, etc., and configured to store various information, and a communication control part 206 configured to control information transmission and reception with at least one hand-held printer 100 via wireless communication.

The CPU 203 processes signals in accordance with a program stored in advanced in ROM while utilizing the temporary storage function of RAM, thereby transmitting and receiving various instruction and information signals to and from the hand-held printer 100. Note that a print processing program based on this embodiment for executing the print processing method made of each step in the flow of FIG. 10 and FIG. 11 described later is included in the above described program stored in ROM.

A program for converting printing instructions to printer code (details omitted) per predetermined format type, such as character style, font, etc., is stored in the above described large-capacity storage device 205 (or the memory 204).

Figure 5:
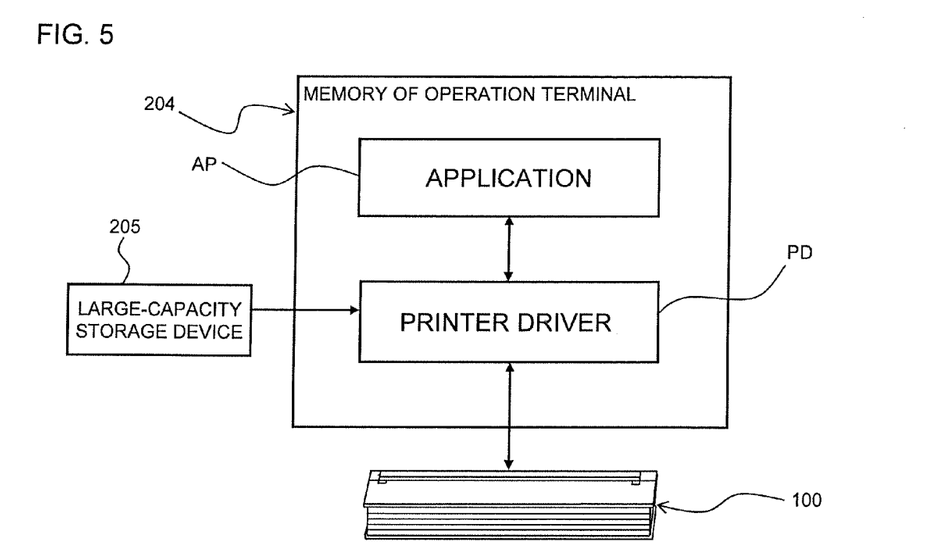
FIG. 5 is a block diagram showing one example of a functional configuration of the process control within an operation terminal.
Figure 6:
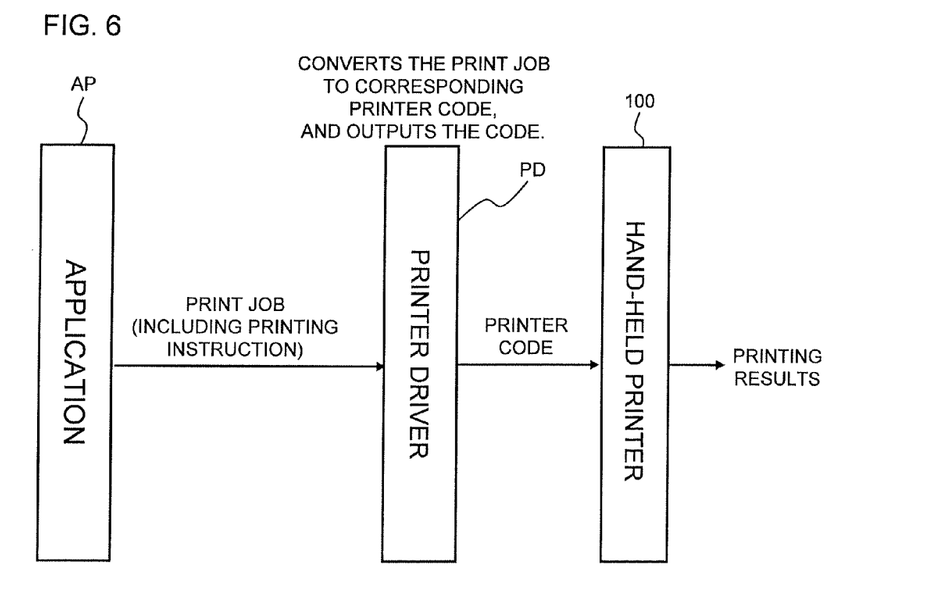
FIG. 6 is a diagram conceptually explaining the flow of information from the operation terminal to the printer.

The following describes the functional configuration and flow of the processing within the operation terminal 200 with reference to FIG. 5 and FIG. 6.

In FIG. 5, at least one program each of an application program AP and program of a printer driver PD are opened and started on the above described memory 204 of the operation terminal 200, enabling transmission and reception of instruction and information signals between the two. Then, the application program AP transmits and receives signals with the printer driver PD, and the printer driver PD transmits and receives signals with the above described large-capacity storage device 205 as well as the hand-held printer 100 via Bluetooth communication between the above described communication control parts 206 and 142.

The application program AP and the printer driver PD are both executed by the one above described CPU 203 of the operation terminal 200. That is, each are individually and independently executed by the CPU 203 by time sharing interrupt control of a known time sharing system (TSS), for example. Further, in the printer driver PD, there may be a program that is incorporated in advance in the fundamental OS of the operation terminal 200 or individually started on the OS in the same manner as other applications.

Here, the application program AP is a document generation or image generation application program, such as, for example, a document management application program for the generation and management of documents or an image management application program for the generation and management of images such as photographs and illustrations, etc. Then, the application program AP generates a print job that includes a printing instruction linked with an operation of the operation part 202 by the operator, and that generated print job is output from the application program to the printer driver PD.

Then, as shown in FIG. 6, the printer driver PD receives the above described print job output from the application program AP, and converts the printing instruction included in the print job to corresponding printer code. Then, the printer code (print data) thus converted is output to the hand-held printer 100. The hand-held printer 100 performs the required various processing and subsequently the required printing based on the printer code input from the printer driver PD.

Special Characteristics of this Embodiment

According to such the operation terminal 200 of this embodiment, each time the hand-held printer 100 is newly connected and wireless communication is performed by the above described Bluetooth communication, etc., identification information unique to each of the hand-held printers 100, such as the printer name and, for example, the Mac address, IP address, etc., is sequentially registered in the memory 204.

Further, each time the operation terminal 200 transmits print data to the hand-held printer 100 via the above described wireless communication to execute printing, a printing operation history log of the hand-held printer 100 is stored in the above described large-capacity storage device 205 (or the memory 204) via the above described operation part 202.

Registered State of a Large Number of Printers

Figure 7A:
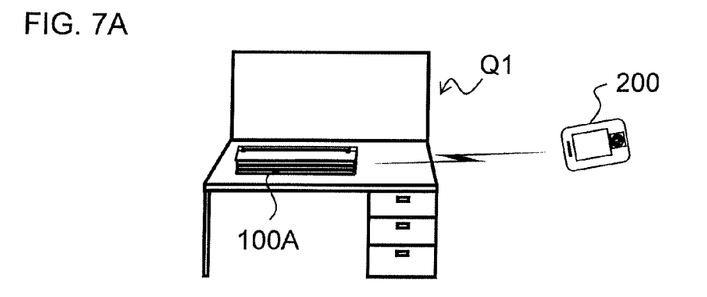
FIG. 7 is an explanatory view showing a state in which the operation terminal is communicating with printers provided to various locations, and an explanatory view showing a state in which the identification information of a large number of hand-held printers has been sequentially registered and accumulated in the operation terminal.
Figure 7B:
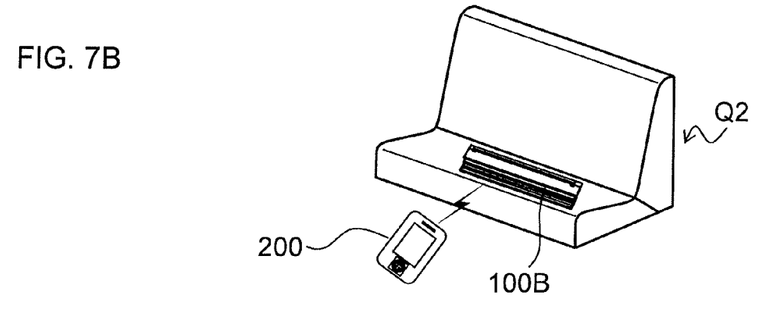
Figure 7C:
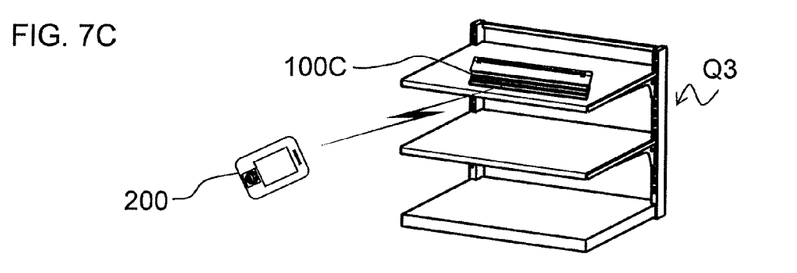

Here, in a case where the operation terminal 200 and the hand-held printer 100 are connected via the above described wireless communication and perform information transmission and reception, the operation terminal 200 is carried, sometimes causing the hand-held printer 100 to be connected and used in various locations. For example, at times the hand-held printer 100 arranged on a desk Q1 (hereinafter suitably "handheld printer 100A"; see the drawing) is subjected to a printing operation by the operation terminal 200 as shown in FIG. 7A, or the hand-held printer 100 arranged on a seat Q2 of a vehicle (hereinafter suitably "hand-held printer 100B"; see the drawing), for example, is subjected to a printing operation by the operation terminal 200 as shown in FIG. 7B, or the hand-held printer 100 arranged on a shelf Q3 (hereinafter suitably "hand-held printer 100C"; see the drawing) is subjected to a printing operation by the operation terminal 200, as shown in FIG. 7C, etc. Hereinafter, these hand-held printers 100A-100C are suitably and simply collectively referred to as the "hand-held printer 100."

Figure 7D:
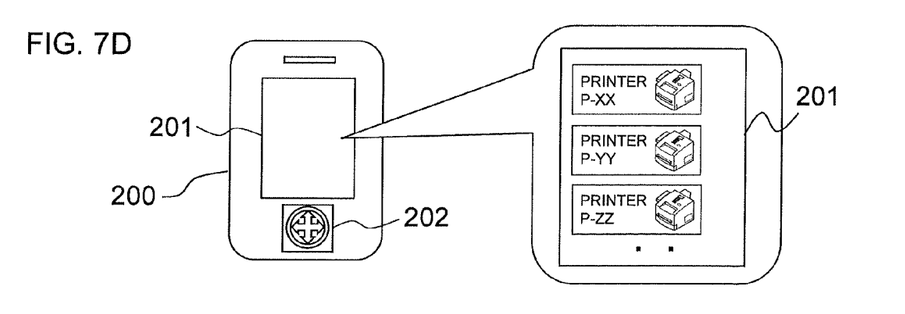

In a case where printing operations are sequentially performed by the one operation terminal 200 on the hand-held printers 100A, 100B, 100C . . . as described above, the printer identification information linked to each of the hand-held printers 100A, 100B, 100C, . . . such as, for example, a large number of printer names such as "Printer P-XX" linked to the above described printer 100A, "Printer P-YY" linked to the above described printer 100B, and "Printer P-ZZ" linked to the above described printer 100C, etc., is accumulated and displayed as shown in FIG. 7D on the display part 201 according to each operation history log. That is, as the usage period of the operation terminal 200 increases, the printing operation history logs of the large number of the hand-held printers 100 are sequentially generated, and the above described identification information of the large number of hand-held printers 100 is sequentially registered in the memory 204 and accumulated and saved in the large-capacity storage device 205 as described above.

Increase in Operation Labor

With such a large number of hand-held printers 100 registered, an operator must perform operations such as the following in order to perform a printing operation from the operation terminal 200 with any one of the large number of these registered hand-held printers 100 (that is, that have been connected in the past) on one particular occasion.

Figure 8A:
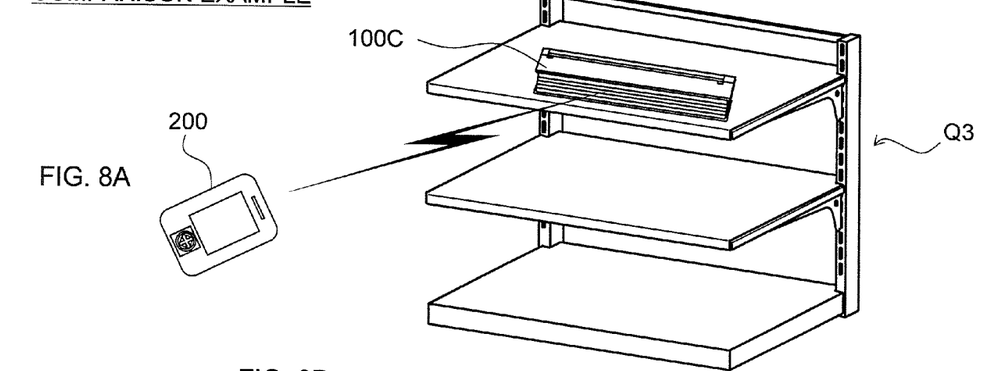
FIG. 8 is an explanatory view for explaining a comparison example where selection of one printer from all hand-held printers registered in the past and execution of printing instructions are required.
Figure 8B:
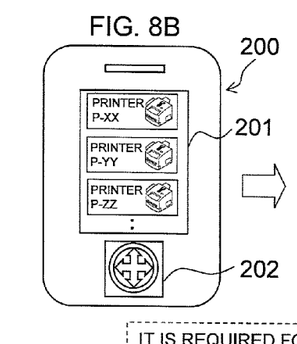

That is, in a case where the above described printer 100C arranged on the shelf Q3, for example, is to be used as shown in FIG. 8A as a comparison example, the operator finds the "Printer P-ZZ" linked to the printer 100C with which a connection attempt is to be made among all of the printer names of the hand-held printers 100 registered in the past and displayed on the display part 201 of the operation terminal 200 as shown in FIG. 8B. Then, the operator selects and specifies the display of that "Printer P-ZZ" using the operation part 202 (the shaded area in the figure indicates that the selection has been made), thereby identifying the "Printer P-ZZ" as the one hand-held printer 100 with which a connection attempt is to be made (see FIG. 8C). Subsequently, the operator must connect with the hand-held printer 100 and transmit the print data via wireless communication by operating the "Print" button on the display part 201 (FIG. 8D), for example. In such a case, even if the one hand-held printer 100 (the hand-held printer 100C, according to the above described example) with which the printing operation attempt is to be made is right in front of or in close range to the operator, for example, the operator must always perform operations such as searching for and selecting the printer name, executing wireless connection, and performing transmission as described above, making the labor burden significant for the operator.

Technique of this Embodiment

Figure 8C:
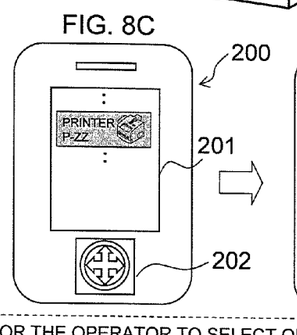
Figure 8D:
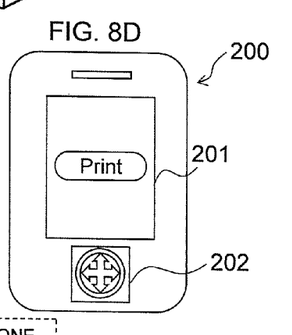
Figures 9A, 9B:
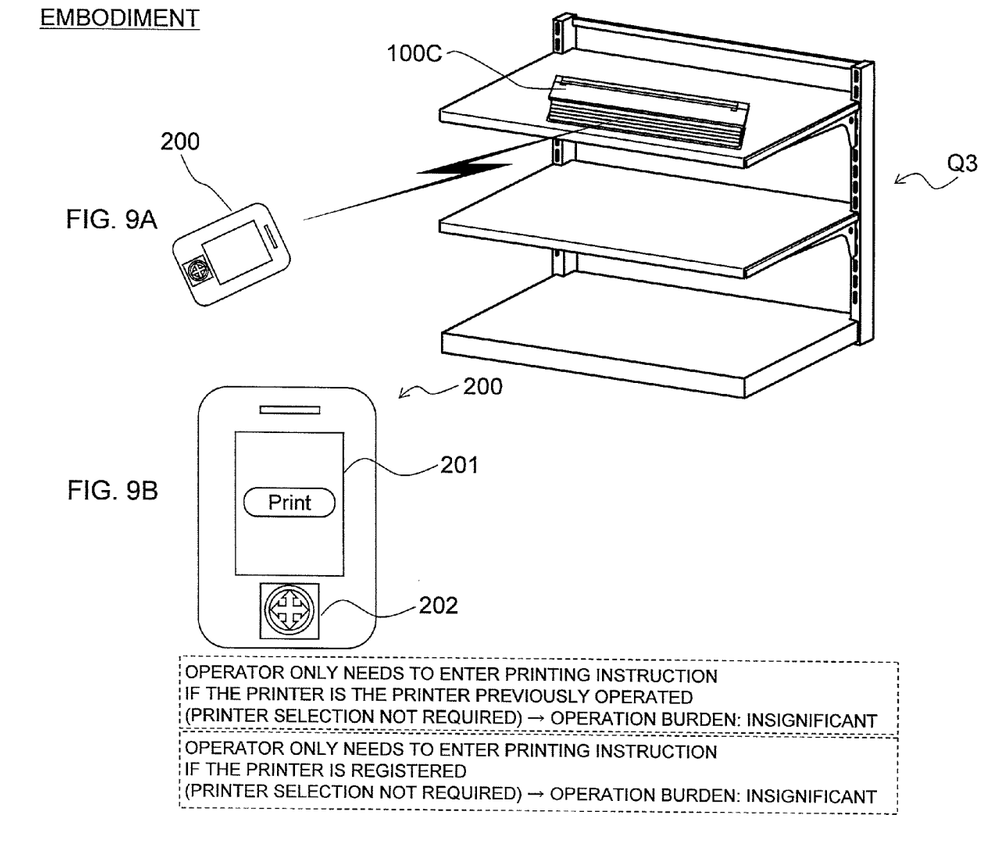
FIG. 9 is an explanatory view for explaining the technique of the embodiment where a printing operation can be performed on a hand-held printer having the latest history log simply by performing printing instructions from the operation terminal.

Here, in this embodiment, as shown in FIG. 9A, if the printer is the previously used hand-held printer 100 (the hand-held printer 100C, according to the previously described example), connection via wireless communication and transmission of the print data are automatically executed by a single printing instruction of the operation terminal 200, that is, by simply operating the "Print" button of the display part 201 shown in FIG. 9B. With this arrangement, operations such as searching through all of the printer names, selecting one printer name therefrom, etc., as shown in the above described FIG. 8B and FIG. 8C are no longer required.

Control Steps

Next, the control contents that are based on the above described print processing program and executed by the above described CPU 203 of the operation terminal 200 in order to achieve the above described contents will be described with reference to FIG. 10.

First, in step S10, the CPU 203 determines whether or not a printing instruction from an operator was input via the above described operation part 202, in other words, whether or not the above described print job was output from the application program AP to the print driver PD. If the operator has not instructed the system to start printing, the condition of step S10 is not satisfied (S10: No), and the flow loops and enters a standby state. When the operator instructs the system to start printing, the condition of step S10 is satisfied (S10: Yes), and the flow proceeds to step S20.

In step S20, the CPU 203 determines whether or not there exists a plurality of the hand-held printers 100 with the above described identification information (unique printer name or, for example, Mac address, IP address, etc., as previously described) registered in the memory 204. If a plurality of the hand-held printers 100 with registered identification information exists, the condition of step S20 is satisfied (S20: Yes), and the flow proceeds to step S30 described later. If only one hand-held printer 100 with registered identification information exists, the condition of step S20 is not satisfied (S20: No) and the flow proceeds to step S21.

In step S21, the CPU 203 identifies (acknowledges) the one hand-held printer 100 registered in the memory 204 as the transmission destination using that identification information (unique printer name or, for example, Mac address, IP address, etc., as previously described).

Subsequently, the flow proceeds to step S22 where the CPU 203 transmits a trial signal (question signal) to the hand-held printer 100 identified in the above described step S21 by Bluetooth communication via the communication control part 206. As previously described, according to the hand-held printer 100, when the control circuit 141 receives the trial signal via the communication control part 142, a response signal linked thereto is output if the hand-held printer 100 is capable of communicating with the operation terminal 200. Accordingly, by receiving the response signal via the communication control part 206, the CPU 203 can acknowledge that that hand-held printer 100 is a communicable printer.

Then, the flow proceeds to step S23 where the CPU 203 determines whether or not communication with the hand-held printer 100 via the communication control part 206 was successful, in other words, whether or not a response signal linked to the question signal in the above described step S22 was received. If communication was not successful, the condition of step S23 is not satisfied (S23: No), and the flow proceeds to step S25 described later. If communication was successful, the condition of step S23 is satisfied (S23: Yes), and the flow proceeds to step S24.

In step S24, the CPU 203 converts the printing instruction included in the above described print job output from the application AP as previously described to printer code using the printer driver PD. Subsequently, the CPU 203 transmits the printer code generated by this conversion to the hand-held printer 100 identified as the above described communication partner via the communication control part 206. This flow then terminates here. The hand-held printer 100 receives the above described output printer code via the communication control part 142, thereby executing the desired printing of the contents instructed in the printer code on the print-receiving paper S via the thermal line head 112.

On the other hand, in step S25, the CPU 203 displays a predetermined error display on the display part 201 of the operation terminal 200, and terminates this flow.

On the other hand, in step S30 to which the flow proceeds when the condition of step S20 is satisfied, the CPU 203 identifies as the transmission destination the one hand-held printer 100 having the latest operation history log based on the printing operation history logs of each of the hand-held printers 100 registered in the large-capacity storage device 205 (or the memory 204), using that identification information (the above described unique printer name or, for example, Mac address, IP address, etc.).

Subsequently, in step S40, the CPU 203, similar to the above described step S22, transmits the trial signal (question signal) to the hand-held printer 100 identified in the above described step S30. As previously described, when the handheld printer 100 receives the trial signal, it outputs a response signal if communication is possible with the operation terminal 200.

Then, in step S50, the CPU 203, similar to the above described step S23, determines whether or not communication with the hand-held printer 100 identified in the above described step S30 was successful. If communication was not successful, the condition of step S50 is not satisfied (S50: No), and the flow proceeds to step S51 described later. If communication was successful, the condition of step S50 is satisfied, and the flow proceeds to step S60.

In step S60, the CPU 203, similar to the above described step S24, converts the printing instruction included in the above described print job to printer code, transmits this converted printer code to the hand-held printer 100 identified as the above described communication partner, and terminates this flow.

On the other hand, in step S51 to which the flow proceeds when the condition of the above described step S50 is not satisfied, the CPU 203 identifies as the transmission destination another hand-held printer 100 other than the hand-held printer 100 having the latest operation history log identified in the above described step S30 based on the history operation history logs of each of the hand-held printers 100 registered in the large-capacity storage device 205 (or the memory 204), using that identification information (the above described unique printer name or, for example, Mac address, IP address, etc.). Note that, in the determination of this other hand-held printer 100, the hand-held printer having the next sequential number following the hand-held printer 100 of the above described latest history log may be identified following a predetermined regularity such as the order of registration, order of names, etc.

Subsequently, the flow proceeds to step S52 where the CPU 203, similar to the above described step S40, transmits the trial signal (question signal) to the hand-held printer 100 identified in the above described step S51. As previously described, when the hand-held printer 100 receives the trial signal, it outputs a response signal if communication is possible with the operation terminal 200.

Subsequently, the flow proceeds to step S53 where the CPU 203, similar to the above described step S50, determines whether or not communication with the hand-held printer 100 identified in the above described step S52 was successful. If communication was successful, the condition of step S53 is satisfied (S53: Yes), and the flow proceeds to step S56 described later. If communication was not successful, the condition of step S53 is not satisfied (S53: No), and the flow proceeds to step S54.

Subsequently, the flow proceeds to step S54 where the CPU 203 determines whether or not trial communication was performed with all of the hand-held printers 100 for which the above described identification information is registered, via the communication control part 206. If trial communication with all of the hand-held printers 100 is not yet completed, the condition of step S54 is not satisfied (S54: No), the flow returns to the above described step S51, and the same steps are repeated. If trial communication with all of the hand-held printers 100 was performed, the condition of step S54 is satisfied (S54: Yes), and the flow proceeds to step S55.

In step S55, similar to the above described step S23, the CPU 203 displays an error display on the display part 201 of the operation terminal 200, and terminates this flow.

On the other hand, in step S56 to which the flow proceeds when the condition of the above described step S53 is satisfied, the CPU 203, similar to the above described steps S24 and S60, converts the printing instruction included in the above described print job to printer code, transmits the converted printer code to the hand-held printer 100 identified as the above described communication partner, and terminates the flow.

As described above, in the printing system PS of this embodiment, when the operator inputs printing instructions using the operation terminal 200, the printing system PS determines whether or not there is a plurality of sets of registered identification information (see step S20). If the decision is made that there is a large number of sets of identification information registered based on the printing operation history logs of the large number of hand-held printers 100 as previously described, information transmission and reception are attempted with the one hand-held printer 100 having the latest printing operation history log (see step S30). With this arrangement, in a case where an attempt is currently made to perform a printing operation using once again the same hand-held printer 100 as during the previous operation, the operator brings the operation terminal 200 relatively near the hand-held printer 100 and performs the above described printing instruction input operation, causing the information to be successfully transmitted and received, the desired print data linked to the printing instruction input to be transmitted to the above described hand-held printer 100, and the printing linked to the print data to thus be executed on the hand-held printer 100.

As described above, in this embodiment, in a case where at least an attempt is made to execute printing using the same hand-held printer 100 as the previous time, the operator only needs to perform a printing instruction input operation relatively near the hand-held printer 100, even with the identification information of a large number of the hand-held printers 100 registered. As a result, compared to the prior technique which always requires operations such as searching for and selecting the identification information of the one hand-held printer 100 with which an attempt to execute printing is to be made, executing wireless communication, and performing transmission, it is possible to significantly reduce the labor burden of the operator.

Further, in particular, according to this embodiment, an attempt is made to transmit and receive information sequentially with the hand-held printer 100 in step S51 even in a case where the hand-held printer 100 that is not the hand-held printer 100 previously subjected to a printing operation is to be currently subjected to the printing operation. Then, if it is confirmed that information can be transmitted and received, the desired print data linked to the printing instruction input is transmitted to the hand-held printer 100 and the printing linked to the print data is executed by the hand-held printer 100. Thus, in this embodiment, even in a case where an attempt is made to execute printing using the hand-held printer 100 that differs from that of the previous time, the operator can perform printing by simply performing a printing instruction input operation if the hand-held printer 100 is a printer for which identification information is already registered. With this arrangement, it is possible to significantly reduced the labor burden of the operator in the same manner as the above.

Further, in particular, according to this embodiment, when information transmission and reception are sequentially performed by passing through steps S51, S52, S53, and S54, returning to step S51, and repeating the same steps, the printer code (print data) is transmitted (see step S56) to the one hand-held printer 100 first determined to be capable of information transmission and reception. With this arrangement, the operator, for example, can reliably execute printing on the hand-held printer 100 by moving to a location near the handheld printer 100 with which the operator wants to perform the printing operation and far away from the other hand-held printers 100 and performing the printing instruction input operation at that location.

Further, in particular, according to this embodiment, unique address information such as, for example, the Mac address, IP address, etc. is registered as the identification information of each of the hand-held printers 100 in the large-capacity storage device 205 (or the memory 204), and an attempt is made to transmit and receive information by identifying each of the hand-held printers 100 using this registered address information (see steps S22, S40, and S52), as previously described. With this arrangement, it is possible to identify the hand-held printer 100 previously used or another hand-held printer 100, which is the current printing operation target, using the registered address information, thereby making it possible to reliably make connections and execute information transmission and reception.

Note that various modifications may be made according to the present embodiment without departing from the spirit and scope of the disclosure, in addition to the above described embodiment. Description will be made below regarding such modifications.

(1) When The Model is Selected

The control contents executed by the CPU 203 of an operation terminal 200A of this modification will now be described with reference to FIG. 11. This modification is an example of a case where the operator specifies the model of the printer preferred as a printing operation target. Note that components identical to those in the above described embodiment are denoted using the same reference numerals, and descriptions thereof will be omitted or simplified.

Figure 10:
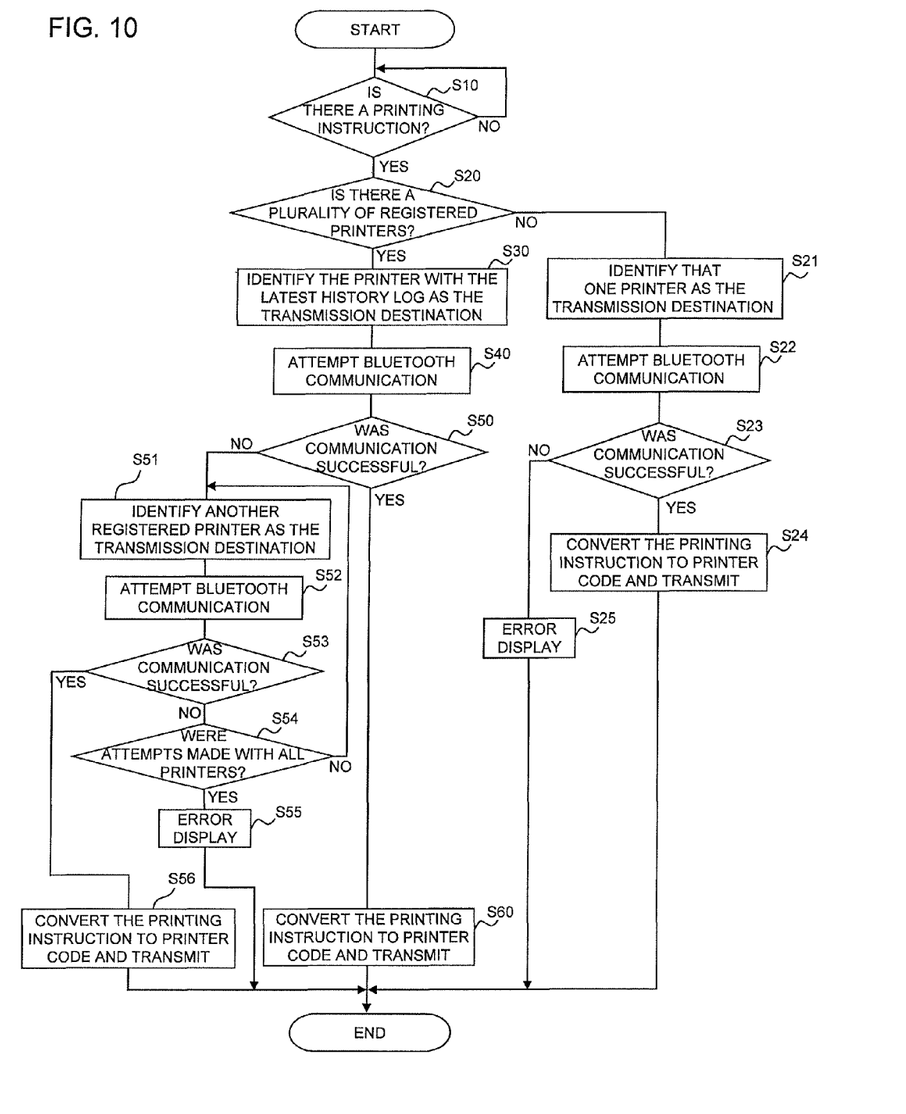
FIG. 10 is a flowchart showing the control contents executed by the CPU of the operation terminal.
Figure 11:
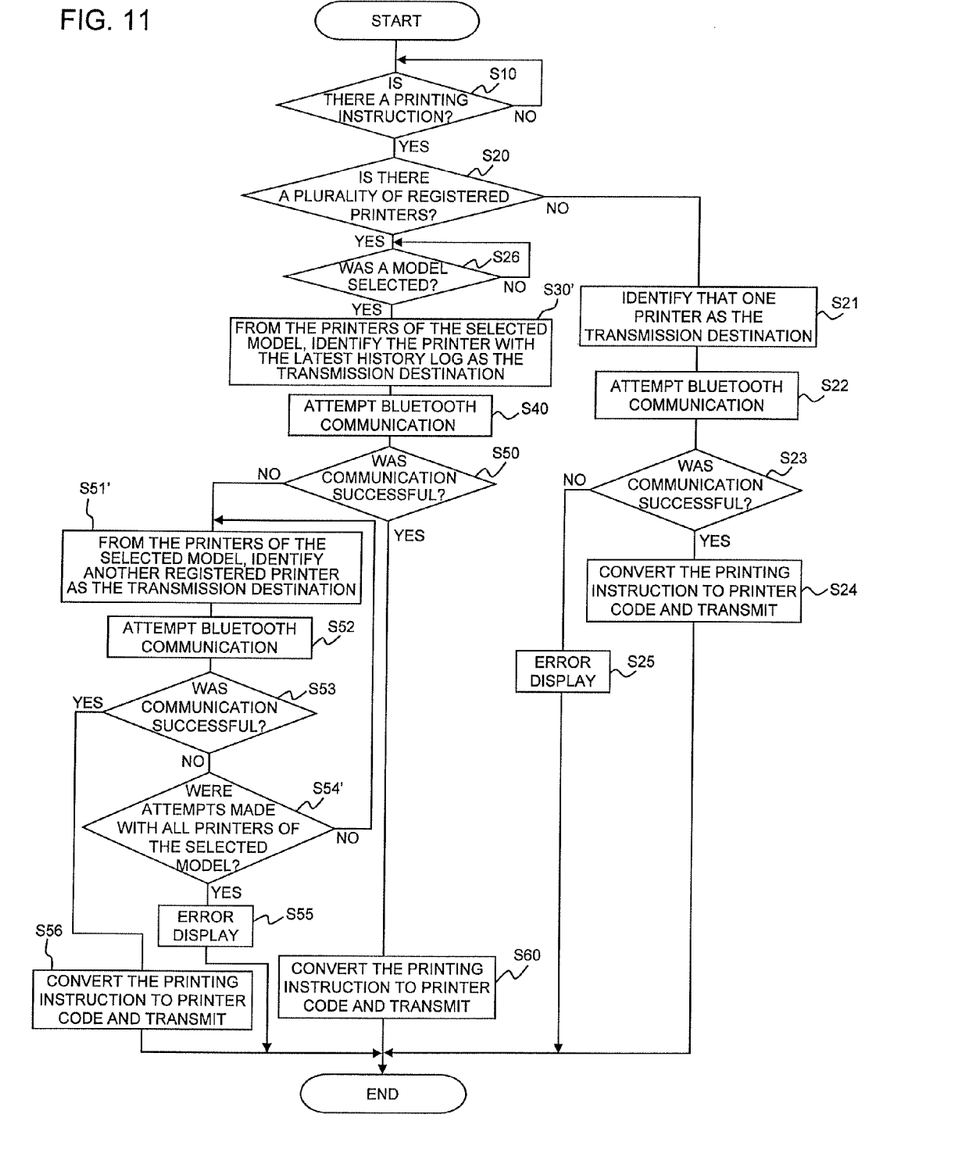
FIG. 11 is a flowchart showing the control contents executed by the CPU of the operation terminal in a modification where the model is selected.

The flow in the flowchart shown in FIG. 11 differs from the flow of FIG. 10 of the above described embodiment in that step S26 is newly provided between the steps S20 and S30, and steps S30', S51', and step S54' are respectively newly provided in place of steps S30, S51, and S54. All other steps in the flow of FIG. 11 are the same as those in the flow of the above described FIG. 10.

In FIG. 11, when the flow passes through step S10 in the same manner as the above described FIG. 10 and the decision is made that the condition of step S20 is satisfied, the flow proceeds to the newly provided step S26. In step S26, the CPU 203 determines whether or not a printer model was selected by the operator. Note that this selection is made in a case where a plurality of models of the hand-held printer 100 exists, and model selection is made therefrom. Or, a connection function with the operation terminal 200 via the same Bluetooth communication as the above described hand-held printer 100 may be provided and, when there is a printer of a model of a type that differs from that of the hand-held printer, any model including the printer of that type may be selected. Until printer model selection is performed, the decision is made that the condition of step S26 is not satisfied (S26: No) and the flow loops and enters a standby state. In a case where model selection is performed, the condition of step S26 is satisfied (S26: Yes), and the flow proceeds to step S30'.

Thereafter, in the steps S30', S51', and S54', the only difference from FIG. 10 is that the same processing as that of the above described steps S30, S51, and S54 is performed on (and limited to) the model selected in the above described step S26; all other processing is the same as that of FIG. 10, and thus descriptions thereof will be omitted.

This modification also provides similar advantages to those in the above described embodiment.

(2) Other

While the above has described an illustrative scenario in which the operation terminal 200 and the hand-held printer 100 are connected by Bluetooth communication, the present disclosure is not limited thereto. That is, even in a case where the operation terminal 200 and the hand-held printer 100 are connected by mutually recognized suitable wireless communication other than the above described Bluetooth communication, such as ad hoc communication, the present disclosure can be applied in the same manner as described above and the same advantages are achieved.

Note that, while the above has described an illustrative scenario in which the present disclosure is applied to the hand-held printer 100 driven by a battery power source as the printer, the present disclosure is not limited thereto. That is, as an example of the printer, the present disclosure may be applied to a printer that forms an image or prints characters on a regular print-receiving paper of a size such as A4, A3, B4, or B5, for example, or a printed label producing apparatus that performs desired printing on a print-receiving tape to produce a printed label. In each of these cases as well, the same advantages are achieved.

Note that the arrow shown in each figure, such as FIG. 4 to FIG. 6, in the above denotes an example of signal flow, but the signal flow direction is not limited thereto.

Also note that the present disclosure is not limited to the steps shown in the above described flow of the flowchart of FIG. 10 and FIG. 11; step additions and deletions as well as sequence changes may be made without departing from the spirit and scope of the disclosure.

Additionally, other than those previously described, techniques according to the above-described embodiments and modification examples may be utilized in combination as appropriate.

What is claimed is:

1. A non-transitory recording medium capable of reading by a control device, storing a print processing program for executing steps on said control device provided at an operation terminal that comprises a communication device configured to perform wireless communication with at least one printer, an operation device configured to execute a desired operation, a memory configured to sequentially register identification information unique to each printer each time a printer is newly connected and wireless communication is performed by said communication device, a storage device configured to store a printing operation history log of a printer via said operation device, and said control device configured to control said operation device and said storage device, said steps comprising:

an instruction determining step for determining whether or not there is an input of a printing instruction via said operation device;

an identification information determining step for determining whether or not there is a plurality of sets of said identification information registered in said memory in a case where the determination is made in said instruction determining step that there is said input of said printing instruction;

a first printer determining step for transmitting a trial signal via said communication device with one first printer for which a printing operation history log that satisfies a predetermined condition of new history log is stored in said storage device, and determining whether or not information transmission and reception are possible with said first printer on the basis of a presence or absence of a response signal from said first printer to said trial signal, in a case where the determination is made in said identification information determining step that there is the plurality of sets of said identification information; and a first print data transmitting step for transmitting desired print data associated with the input of said printing instruction to said first printer via said communication device in a case where the determination is made in said first printer determining step that information transmission and reception are possible with said first printer.

2. The non-transitory recording medium according to claim 1, wherein:

in the first printer determining step, information transmission and reception is attempted to said one first printer for which a latest printing operation history log is stored as the predetermined condition of new history log, and determination whether or not information transmission and reception are possible with the first printer is performed.

3. The non-transitory recording medium according to claim 1, wherein:

said control device is further caused to execute a selection information acquisition step for acquiring printer model selection information based on the operation of said operation device in a case where the determination is made in said identification information determining step that there is the plurality of sets of said identification information; and in the first printer determining step, information transmission and reception is attempted to said first printer, which is a model selected by the operation of said operation device based on said printer model selection information acquired in said selection information acquisition step and for which a latest printing operation history log is stored as the predetermined condition of new history log, and determination whether or not information transmission and reception are possible with said first printer is performed.

4. The non-transitory recording medium according to claim 1, wherein said control device is further caused to execute:

a second printer determining step for sequentially attempting to perform information transmission and reception via said communication device with at least one second printer, for which said identification information is registered in said memory, other than said first printer, and determining whether or not information transmission and reception are possible with each second printer, in a case where the determination is made that it is unsuccessful to transmit and receive information with said first printer in said first printer determining step; and a second print data transmitting step for transmitting desired print data associated with the input of said printing instruction to the at least one second printer via said communication device in a case where the determination is made in said second printer determining step that information transmission and reception are possible with one said second printer according to said information transmission and reception sequentially performed.

5. The non-transitory recording medium according to claim 4, wherein:

in said second print data transmitting step, said desired print data is transmitted to the at least one second printer for which information transmission and reception is first determined to be possible according to said information transmission and reception sequentially performed in said second printer determining step.

6. The non-transitory recording medium according to claim 1, wherein:

said memory registers address information of each printer as said identification information of each printer; and in said first printer determining step or second printer determining step, said information transmission and reception are attempted while identifying said first or second printer using said address information of said first or second printer registered by said memory.

7. A print processing method executed by an operation terminal that comprises a communication device configured to perform wireless communication with at least one printer, an operation device configured to execute a desired operation, a memory configured to sequentially register identification information unique to each printer each time a printer is newly connected and wireless communication is performed by said communication device, and a storage device configured to store a printing operation history log of a printer via said operation device, said print processing method comprising the steps of:

an instruction determining step for determining whether or not there is an input of a printing instruction via said operation device;

an identification information determining step for determining whether or not there is a plurality of sets of said identification information registered in said memory in a case where the determination is made in said instruction determining step that there is said input of said printing instruction;

a first printer determining step for transmitting a trial signal via said communication device with one first printer for which a printing operation history log that satisfies a predetermined condition of new history log is stored in said storage device, and determining whether or not information transmission and reception are possible with said first printer on the basis of a presence or absence of a response signal from said first printer to said trial signal, in a case where the determination is made in said identification information determining step that there is the plurality of sets of said identification information; and a first print data transmitting step for transmitting desired print data associated with the input of said printing instruction to said first printer via said communication device in a case where the determination is made in said first printer determining step that information transmission and reception are possible with said first printer.

8. The non-transitory recording medium according to claim 1, wherein:

said control device is further caused to execute a registration step for sequentially registering identification information unique to each of the printers in the memory each time the printer is newly connected and wireless communication is performed by said communication device, and in the identification information determining step, it is determined whether or not there is a plurality of sets of said identification information registered in said memory in the registration step.

9. The print processing method according to claim 7, further comprising a registration step for sequentially registering identification information unique to each of the printers in the memory each time the printer is newly connected and wireless communication is performed by said communication device, wherein in the identification information determining step, it is determined whether or not there is a plurality of sets of said identification information registered in said memory in the registration step.

10. The non-transitory recording medium according to claim 1, wherein:

in said identification information determining step, it is determined whether a print button is operated or not.

11. The non-transitory recording medium according to claim 1, wherein:

said identification information is Mac address.

* * * * *